March 6, 1973 G. HESSLAND ET AL 3,719,364

SOUND RECORDING AND REPRODUCING APPARATUS

Filed April 30, 1969 4 Sheets-Sheet 1

Inventor:

GEORG HESSLAND

ULRICH GRÄBEL

By Michael S. Striker

Attorney

SOUND RECORDING AND REPRODUCING APPARATUS

Filed April 30, 1969 4 Sheets-Sheet 2

Inventor:

GERD HESSLAND
ULRICH GRABEL
By Mitchell ...
Attorneys

Inventor:

GERD HESSLAND

ULRICH GRABEL

By [illegible]

SOUND RECORDING AND REPRODUCING APPARATUS

Filed April 30, 1969 4 Sheets-Sheet 4

Inventor:

GERD HESSLAND
ULRICH GRÄBEL

By [illegible]
Attorneys

United States Patent Office 3,719,364

Patented Mar. 6, 1973

3,719,364

SOUND RECORDING AND REPRODUCING APPARATUS

Gerd Hessland, Penzendorf, and Ulrich Gräbel, Nuremberg, Germany, assignors to Grundig-Elektro-Mechanische Versuchsanstalt, Furth, Bavaria, Germany Filed Apr. 30, 1969, Ser. No. 820,489
Claims priority, application Germany, May 2, 1968, P 17 72 353.4
Int. Cl. G11b *15/24*
U.S. Cl. 274—4 D 6 Claims

ABSTRACT OF THE DISCLOSURE

A tape recorder wherein all operations can be initiated and terminated by a single actuating member which is rotatable in a starting position and is movable sideways to and from starting position. Angular movements of the actuating member effect displacements of a platform which carries the sound heads and the pressing roller for the tape. Sidewise movements of the actuating member are utilized to effect rapid forward advance or rapid rewinding of tape by way of friction wheels which receive motion from a flywheel.

BACKGROUND OF THE INVENTION

The present invention relates to mechanisms for actuating the driving and/or driven parts in apparatus for recording and/or reproduction of sound. More particularly, the invention relates to tape recorders and analogous sound recording and reproducing apparatus wherein the drive for the tape or another carrier of intelligence is started, accelerated, decelerated, reversed, arrested and/or ejected by a single actuating member.

It is known to provide a tape recorder with an actuating mechanism which includes movable parts guided by pin-and-slot connections and/or cam faces to effect starting, stoppage, speed changes or reversal in the direction of movement of tape. The actuating mechanism moves the pressing roll or rolls, the speed changer gears and/or other parts. A drawback of such actuating mechanisms is that they cannot be properly manipulated by one hand, especially for the purpose of starting the tape at normal speed. This is due to the fact that the elastic pressing roll of the tape recorder must engage the sound shaft with a considerable force in order to pinch the tape between such parts and to insure that the tape is transported without slippage. Consequently, a relatively small portable tape recorder, especially a miniature tape recorder which is operated by a battery-driven motor, is likely to slide along its support when the user wishes to set the actuating mechanism for normal-speed transport of tape in the forward direction. As a rule, the user must grasp the housing of the tape recorder with one hand and thereupon actuates a knob or button in order to effect a relatively small movement of such part and to thereby locate the actuating mechanism in a position in which the tape is properly pinched between the pressing roll and the sound shaft.

It is also known to utilize an actuating mechanism which comprises a set of depressible pushbuttons or keys. A drawback of such mechanisms is that they must be provided with costly and complicated interlocking devices which block movements of certain keys when a selected key is depressed. Furthermore, the user is often confused by an actuating mechanism which employs a relatively large number of keys, and such keys occupy too much room in a portable tape recorder, especially in a battery-operated miniature tape recorder which can be carried along in a pocket. Even the depression of a key to start the motor of the tape recorder at normal speed or to drive the tape at a normal speed often necessitates the use of two hands.

It is also known to employ in tape recorders actuating mechanisms which include a single rotary knob. Such actuating mechanisms are normally preferred because their manipulation is simpler and because they occupy relatively little room; however, and since the knob must be moved to more than two positions (operation at normal speed, rapid advance, rapid rewind, stoppage), it is normally necessary to rotate the knob through one or more positions in order to locate it in a selected position. For example, if the motor is started in response to rotation of the knob to one end position and is arrested in response to rotation of the knob to the other end position, the knob must move through one or more intermediate positions whenever the operator wishes to rotate the knob between such end positions. In many instances, various operations can be carried out only in a predetermined sequence.

SUMMARY OF THE INVENTION

An object of the present invention is to provide a simple and compact actuating mechanism for tape recorders or the like and to provide the mechanism with a single manually operated actuating member which can be moved to several positions in response to exertion of a relatively small force and in such a way that it may reach any given position without initiating undesired movements of driving and/or driven parts.

Another object of the invention is to provide novel and improved operative connections between a single actuating member and various driven and driving parts of a tape recorder or the like.

A further object of the invention is to provide an actuating mechanism with a single knob and to construct the actuating mechanism in such a way that the knob can initiate or terminate a large number of operations without moving through one or more intermediate positions and without necessitating the provision of complicated interlocking means.

Still another object of the invention is to provide a tape recorder, particularly a tape recorder utilizing tape which is stored in a cartridge, which embodies the improved actuating mechanism.

The invention is embodied in a sound recording and reproducing apparatus, particularly in a tape recorder which preferably employs cartridges for convoluted tape. The apparatus comprises frame means and a single actuating member supported by the frame means for movement in as well as to and from a starting position. The actuating member comprises a first portion which is rotatable with reference to the frame means about its axis, (in starting position of the actuating member) between a plurality of spaced angular positions, and a second portion spaced from the first portion radially of the axis of the first portion and fixed thereto to share the rotary movement of the first portion and to thereby travel in an arc about the axis of the first portion. The first and second portions are further movable substantially at right angles to the axis of the first portion between the starting position and a plurality of additional positions to thereby effect substantially translatory movements of the second portion.

Angular movements of the second portion can be utilized to start the motor of the drive for the tape advancing means and to drive the tape advancing means at a normal speed, to effect at least partial ejection of the cartridge, to arrest the motor and to maintain the tape engaging parts in an intermediate position while the motor is running. Sidewise movements of the first and second portions of the actuating member can be utilized to effect rapid forward movement and rewinding of the tape. The arrangement is preferably such that the first and second portions must be returned or automatically returns to a predetermined angular position before the actuating member can leave its starting position.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

The drawings illustrate a portion of a tape recording and reproducing apparatus which comprises a frame or chassis including a plate-like tape deck 5. The major part of the mechanical drive means is installed in the chassis at a level below the deck 5; the remaining parts of such drive means and the elements which directly engage with the tape 21 are located above the deck.

Figure 1:
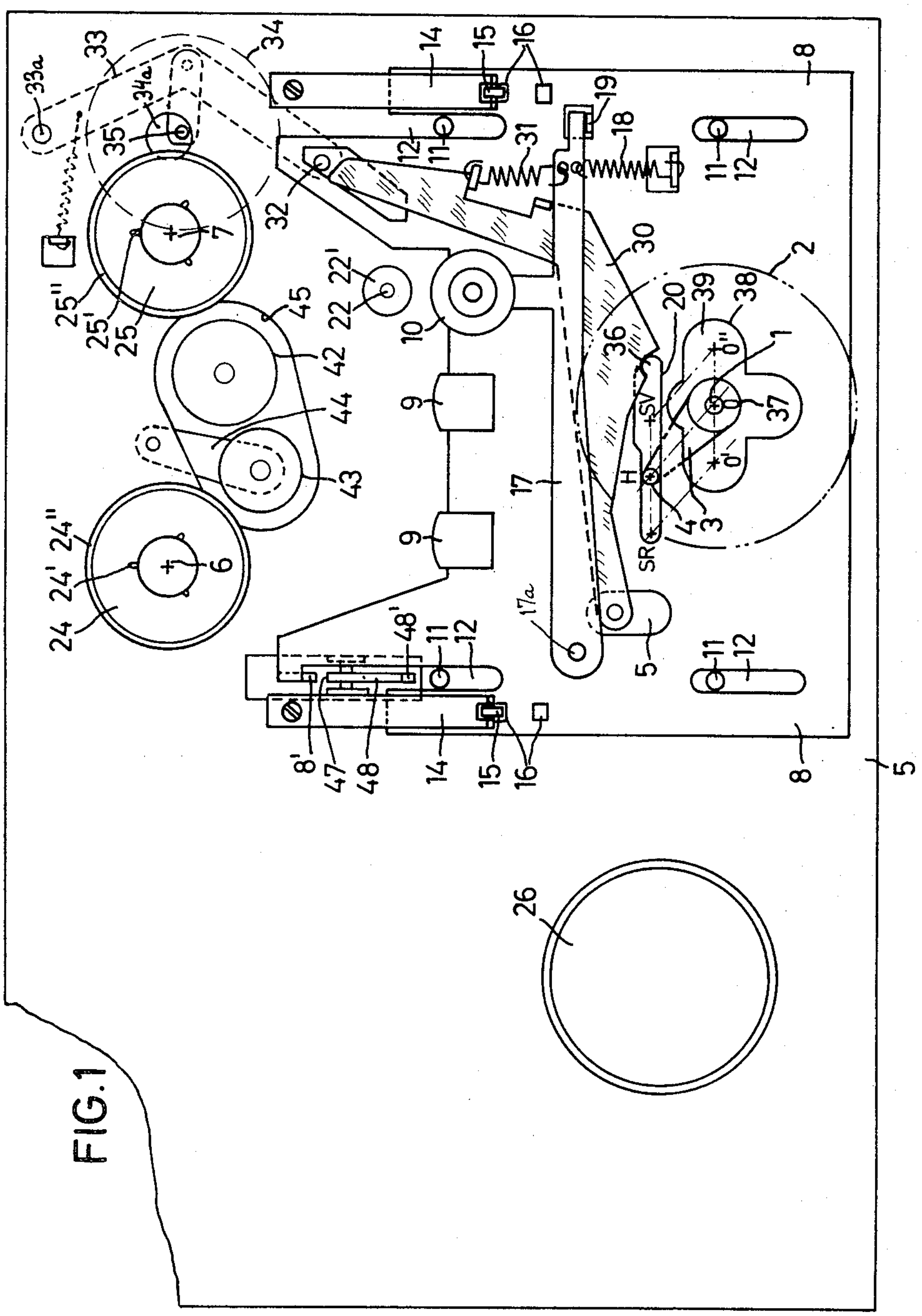
FIG. 1 is a schematic plan view of a tape recorder which embodies the invention, the first portion of the actuating member being shown in a predetermined angular position and the cartridge for tape being detached from the drive for its reels.

In accordance with a feature of the present invention, the apparatus comprises a single actuating member which includes a first portion composed of a vertical shaft or stem 1 and a wheel-shaped handgrip portion or knob 2 fixedly secured to the shaft 1. The knob 2 performs several functions including effecting normal and rapid advance of tape 21 and rewinding of tape. The knob 2 is rotatable about the axis of the shaft 1 and is further capable of performing with the shaft several translatory or sidewise additional) movements in directions at right angles to the shaft axis. FIG. 1 shows the starting position of the shaft 1 by solid lines; the outline of the knob 2 is indicated by phantom lines. The actuating member further comprises a connecting portion here shown as a crank arm 3 which is rigid with and extends radially from the shaf 1 at a level below the tape deck 5 and carries an upwardly extending post 4 which constitutes a second portion of the actuating member and is received in an elongated slot 20 of a carriage or platform 8. The character H denotes in FIG. 1 the normal or starting position of the post 4; such position corresponds to the solid-line starting position of the shaft 1. By rotating the knob 2 in a clockwise direction through an angle of approximately 70 degrees, the user of the apparatus can swing the post 4 about the axis of the shaft 1 to the angular position N of FIG. 2 in which the tape 21 is driven forwardly at a normal speed. In addition, the knob 2 can be pushed (not rotated) from the normal position of FIG. 1 in a direction to the right to effect transport of the tape 21 at a high speed (additional position SV of the post 4) or in a direction to the left to rapidly rewind the tape (additional position SR of the post 4). During such sidewise movement of the knob 2, the angular position of the crank arm 3 with reference to the axis of the shaft 1 remains substantially unchanged. The position SV of the post 4 corresponds to the additional position 0″ of the shaft 1, and the position SR of the post 4 corresponds to the additional position 0′ of the shaft 1. The starting position of the shaft 1 is denoted by the character 0.

Figure 2:
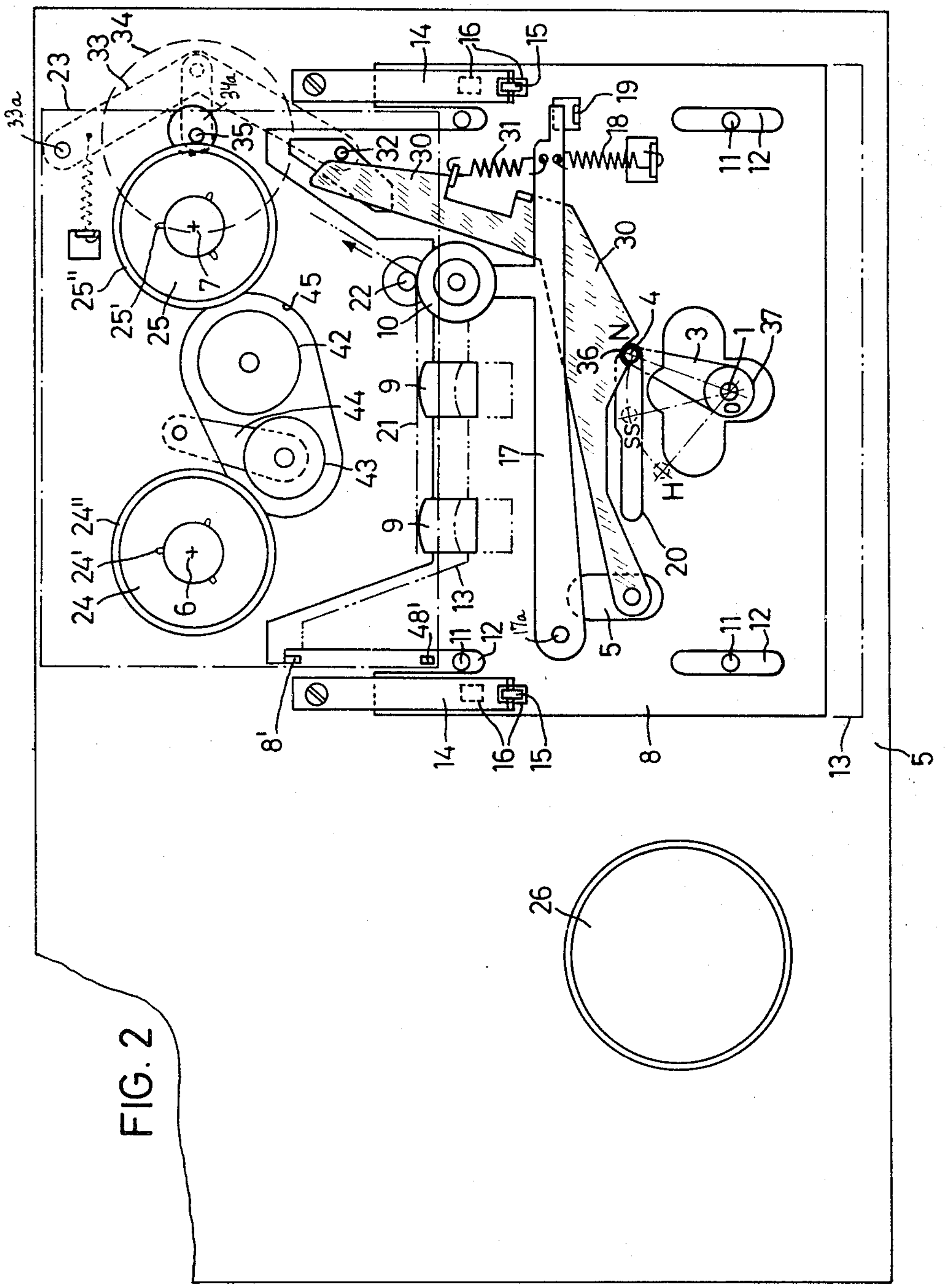
FIG. 2 is a similar view of the tape recorder but showing the first portion in an angular position it assumes when the tape is advanced at normal speed.

The aforementioned carriage or platform 8 is movably mounted on the tape deck 5 and supports, among others, several tape engaging elements including one or more recording, reproducing and/or erasing heads 9 and a pressing roll 10. The platform 8 is reciprocable toward and away from the spindles 6, 7 of the supply and takeup reels for the tape 21. The means for guiding the platform 8 during movement with reference to the tape deck 5 comprises four pins 11 mounted on the deck 5 and extending into elongated slots 12 of the platform. The two end positions of the platform 8 are shown in FIG. 2; these include the solid-line end position and the phantom-line end position 13. The apparatus further comprises detent means for yieldably holding the platform 8 in each of its end positions. Such detent means comprises rolls 15 which are mounted on holders 14 each of which constitutes a leaf spring, and rectangular cutouts 16 provided in the platform. The leaf springs 14 are mounted on the deck 5. Each roll 15 can enter one of the associated cutouts 16 by snap action when the platform 8 reaches or approaches the corresponding end position.

Figure 2A:
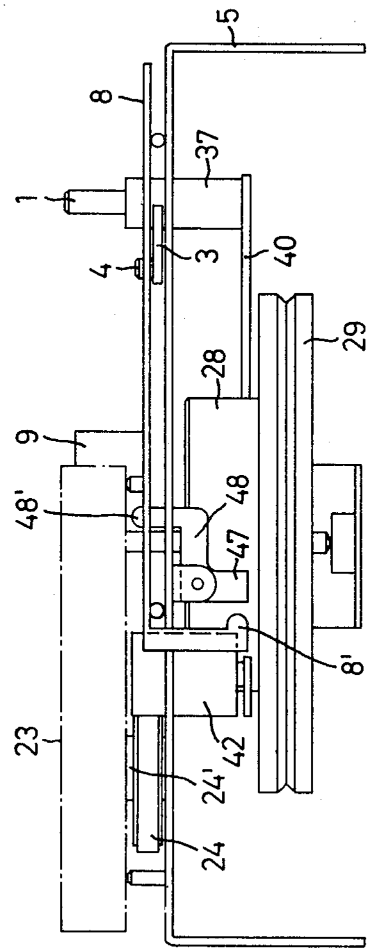
FIG. 2*a* is a side elevational view of the structure shown in FIG. 2.

The aforementioned pressing roll 10 is mounted on a carrier 17 here shown as a lever which is pivotally mounted on a pin **17*a* of the platform 8. A stressed helical spring 18 normally biases a portion of the lever 17 against a bent-over stop or lug 19 of the platform 8 (see FIG. 1). The slot 20 of the platform 8 extends in substantial parallelism with the line connecting the axes of the spindles 6 and 7. During turning of the knob 2 in a clockwise direction, as viewed in FIG. 1, in order to move the post 4 from the solid-line position H of FIG. 1 to the solid-line position N of FIG. 2, the post 4 displaces the platform 8 from the first end position of FIG. 1 to the second position shown in FIG. 2 by solid lines. The phantom-line position 13 of the platform 8 in FIG. 2 corresponds to the solid-line position of FIG. 1. The sound heads 9 then engage the tape 21 and the pressing roll 10 urges the tape against a sound shaft 22. The latter is mounted in a bearing 22′ which is installed on the tape deck 5 (see FIGS. 1 and 3) and is connected with a flywheel 28. The tape 21 is preferably convoluted on supply and takeup reels which are mounted in a suitable source of tape, for example, in a cartridge or cassette 23** (shown in FIGS. 2 and 2*a* by phantom lines). The two reels have coupling portions which can engage complementary coupling portions 24′, 25′ provided on two cartridge mounting means here shown as including turntables 24, 25 which are coaxially mounted on the spindles 6, 7. The numerals 24″, 25″ respectively denote friction linings on the turntables 24, 25. The turntables 24, 25 and their coupling portions 24′, 25′ respectively serve as a means for advancing the supply reel and the takeup reel of the cartridge 23.

The apparatus further comprises a prime mover 26 (FIG. 3) which is an electric motor adapted to be driven by current from one or more batteries and/or by current taken from a conventional outlet. The output shaft of the motor 26 carries a pulley for a plastic belt 27 which rotates a pulley 29 coaxially secured to the flywheel 28. A motion transmitting lever 30 which is pivotally mounted on the deck 5 (see FIG. 1) is turnable by the post 4 against the action of a helical spring 31. The free end of the lever 30 engages a pin 32 on a further motion transmitting lever 33 which is also biased by a spring and carries a torque transmitting friction wheel 34. The friction wheel 34 drives a coaxial shaft 35 through the intermediary of a friction clutch **34*a* and the shaft 35 can be moved into engagement with the friction lining 25″ to thereby rotate the takeup turntable 25. The friction wheel 34 is rotated by the flywheel 28 (see FIG. 3). The lever 33 is pivotable on a pin 33*a* of the deck 5 (see FIG. 1) and moves the shaft 35 into engagement with the lining 25″ in the angular position N of the post 4. The lever 30** is formed with a notch 36 (FIG. 2) which receives the post 4 in the position N; the lever 30 (which is biased in a clockwise direction by the spring 31) then serves as a yieldable detent means for the post 4.

During movement from the position H to the position N, the post 4 can assume an intermediate position SS (FIG. 2) in which it maintains the platform 8 in such position that the pressing roll 10 is still disengaged from the tape 21 but the motor 26 is on and the electrical amplifier system is operative. This is the so-called rapid-stop position of the post 4. The operator can move the post 4 from the position SS to the position N (whereby the tape 21 is immediately advanced at normal speed) or to the position H to arrest the motor 26 and flywheel 28. An advantage of such intermediate position is that the tape 21 can be started for recordal or reproduction of sound while the motor 26 is running; this eliminates noise which normally develops during starting or deceleration of the motor. Consequently, the recordal or reproduction of sound can be effected with a minimum of interference. Also, the amplifier system and/or the mechanical parts of the drive for the tape 21 can be adjusted in the rapid-stop position SS of the post 4.

The knob 2 can further serve as a means for effecting partial or complete ejection or separation of the cartridge 23. This can be achieved by rotating the knob 2 in a counterclockwise direction to pivot the post 4 in a counterclockwise direction slightly beyond the angular position shown in FIG. 1. Such angular movement causes the platform 8 to move forwardly (downwardly, as viewed in FIG. 1) beyond the illustrated solid-line position whereby a projecting finger 8' of the platform (which extends downwardly toward the deck 5) engages one arm 47 of a two armed ejector lever 48 (see FIG. 2*a*) the other arm 48' of which extends upwardly through a window of the platform 8 and lifts the bottom wall of the casing of the cartridge 23 so that the coupling portions of reels in the cartridge are disengaged from the coupling portions 24', 25' of the turntables 24, 25. The finger 8' and ejector lever 48 can effect partial or complete separation of the cartridge 23 so that the latter can be readily removed from the apparatus.

As mentioned hereinabove, the entire actuating member 1–4 can be shifted sideways to move the shaft 1 from the position 0 to the position 0' (rapid rewinding of tape) or 0'' (rapid advance of tape). The shaft 1 carries a ring-shaped or sleeve-like hub portion 37 which is movable in a substantially cruciform recess or opening 39 of the platform 8. The confining surface 38 surrounding the opening 38 arrests the hub portion 37 in the position 0' or 0'' of the shaft 1. The hub portion 37 is rotatably mounted on a pivotable lever 40 (FIG. 3) whose pivot pin 41 is affixed to the tape deck 5. The lever 40 carries an intermediate rotary motion transmitting friction wheel 42. When the shaft 1 is moved to the position 0'', the intermediate friction wheel 42 is caused by lever 40 to turn in a clockwise direction, as viewed in FIG. 3, whereby the friction lining 25'' of the takeup turntable 25 receives torque from the motor 26 by way of the belt 27, flywheel 28 and intermediate friction wheel 42. When the shaft 1 is moved from the position 0 to the position 0' (rapid rewinding of tape 21), the lever 40 pivots in a counterclockwise direction, as viewed in FIG. 3, and causes the supply turntable 24 to receive torque from the motor 26 by way of the lining 24'', a second intermediate rotary motion transmitting friction wheel 43, friction wheel 42, flywheel 28, and belt 27. The second intermediate friction wheel 43 is mounted on a lever 44 which is installed on the tape deck 5. The intermediate friction wheels 42 43 extend through an aperture 45 (FIGS. 1 and 2) of the tape deck 5 so that they are located in the plane of the linings 24'', 25'' on the turntables 24, 25.

Figure 3:
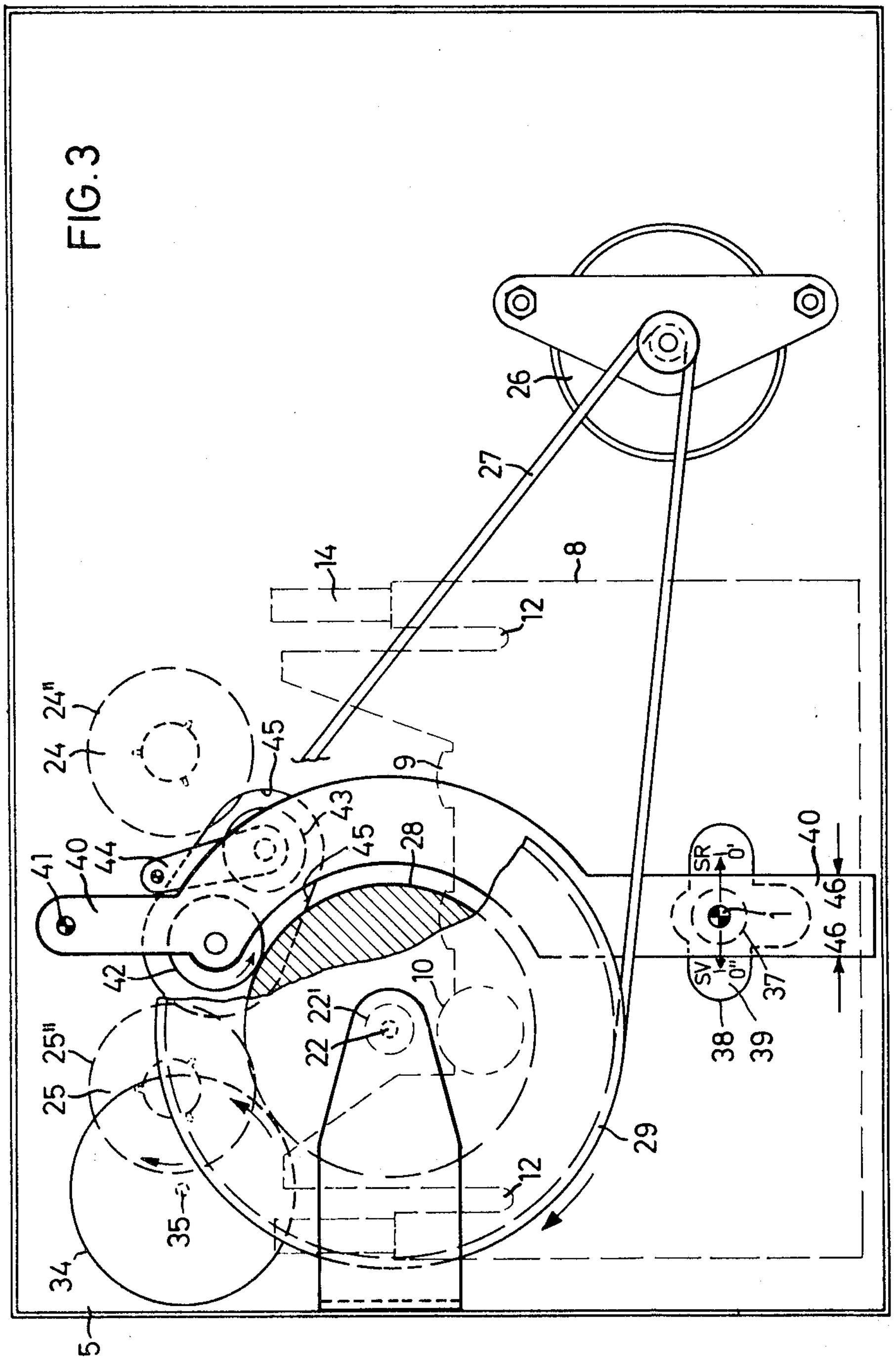
FIG. 3 is a bottom plan view of the tape recorder with the first portion of the actuating member shown in a position corresponding to that of FIG. 1.

When the knob 2 is in the starting position (FIG. 1), the lever 40 is held in the position of FIG. 3 by two one-armed levers which act thereon in directions indicated by arrows 46. These one-armed levers are mounted on the tape deck 5 and their free ends are coupled to each other by a helical expansion spring so that they bear against the adjoining edge faces of the lever 40 and maintain the latter in the illustrated position. The lever 40 and/or the one-armed levers can be provided with suitable abutments which engage each other. The one-armed levers serve as a restoring means for automatically returning the lever 40 to the illustrated position (corresponding to the starting position 0 of the shaft 1) after the shaft 1 is moved to the position 0' or 0''. The spring which couples the one-armed levers opposes manual displacement of the knob 2 in a direction to move the post 4 to the position SV or SR.

The confining surface 38 of the platform 8 holds the actuating member 1–4 against moveemnt from starting position when the post 4 is moved away from the position H. This is clearly shown in FIG. 2 wherein the hub portion 37 extends into the lowermost part of the opening 39 so that the shaft 1 cannot be moved to the additional position 0' or 0''. That angular position of the shaft 1 in which the post 4 assumes the position H is the first angular position of the shaft.

It will be seen that the actuating member 1–4 can be moved to a substantial number of angular positions in the starting position thereof. Such starting position is the solid-line position of FIG. 1. The angular position of the actuating member correspond to the positions H, SS and N of the post 4 as well as to that position in which the ejector lever 48 separates the cartridge 23 from the mounting means 24, 25. The actuating member 1–4 is further movable from starting position to the additional positions which correspond to the positions SR, SV of the post 4 and hence to the positions 0', 0'' of the shaft 1. With the single exception of the position N, the post 4 can be moved from any given angular position to any other angular position and from any given additional position to another additional position while remaining in or moving only through the starting position. In order to move to and from the position N, the post 4 must move through the intermediate position SS. All such movements can be effected with one hand.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

1. In a sound recording and reproducing apparatus which utilizes magnetic tape, a combination comprising frame means; mounting means provided on said frame means for supporting a cassette source of tape and including tape-advancing means operable to move said tape at various speeds in the same or opposite directions; a single actuating means operably associated with said tape advancing means and mounted in said frame means (a) for rotary movement in a starting position from a first angular position to at least one alternate angular position to cause sad tape-advancing means to advance said tape at one of said speeds and (b) for linearly shiftable movement in said first angular position from said starting position to a first shifted position to cause said tape-advancing means to advance the tape at a second of said speeds and a second shifted position to cause said tape-advancing means to advance said tape at a third of said speeds, said first and second shifted positions being substantially symmetrical relative to said starting position; means preventing said single actuating means from rotating from said first angular position when shifted from said starting position thereof to said first and second shifted positions, whereby said tape-advancing means are adapted to advance in any position of said single actuating member said tape only at one of said speeds; and means for preventing linear shifting movement of said single actuating means from said starting position to said shifted positions while said single actuating means is out of said first angular position.

2. A combination as defined in claim 1, said advancing means including first and second advancing means respectively operable for advancing the tape in opposite directions; and further comprising rotary motion transmitting means movably mounted on said frame means and operative to connect said drive means with said first advancing means in response to movement of said actuating member to one of said shifted positions and to connect the drive means with said second advancing means in response to movement of said actuating member to the other of said shifted positions.

3. A combination as defined in claim 1, wherein said mounting means is arranged to maintain a length of tape in a predetermined position and further comprising carriage means movably supported by said frame means and coupled with said actuating member for displacement in response to rotation of said actuating member, and tape-engaging means mounted on said carriage means to share the displacement of said carriage means in response to rotation of said actuating member and to move into and out of engagement with said length of tape in dependence upon rotation of said actuating member.

4. A combination as defined in claim 1, further comprising ejector means operative to at least partially separate the source of tape from said mounting means in response to movement of said actuating member to a further angular position.

5. A combination as defined in claim 4, wherein said frame means includes a deck and wherein said cassette source is adjacent to said deck when supported by said mounting means, said ejector means comprising lever means pivotally mounted on said frame means and carriage means shiftable by said actuating member with reference to said deck in response to movement of said actuating member between said angular positions and operative to pivot said lever means on movement of said actuating member to said further angular position whereby said lever means effects at least partial separation of the cassette source from said mounting means.

6. A combination as defined in claim 3, wherein said carriage means has an elongated slot and said actuating member comprises a post extending into said slot, said tape-engaging means including at least one sound head.

References Cited

UNITED STATES PATENTS

| | | | |
|---|---|---|---|
| 3,377,438 | 4/1968 | Schroter | 274—4 C UX |
| 2,971,762 | 2/1961 | Zorn | 274—4 D |
| 3,093,335 | 7/1963 | Lane | 242—204 |
| 3,495,835 | 2/1970 | Laa | 274—4 E |
| 2,950,069 | 8/1960 | Maples | 242—208 |
| 3,073,540 | 1/1963 | Guest | 242—201 |
| 3,458,158 | 7/1969 | Ohira. | |

FOREIGN PATENTS

| | | | |
|---|---|---|---|
| 576,452 | 1967 | Japan | 274—4 E |

LEONARD FORMAN, Primary Examiner

D. A. DEARING, Assistant Examiner

U.S. Cl. X.R.

242—200, 201, 206; 274—4 E